(No Model.) 2 Sheets—Sheet 1.
E. THOMSON.
SYSTEM OF ELECTRIC DISTRIBUTION.
No. 322,138. Patented July 14, 1885.
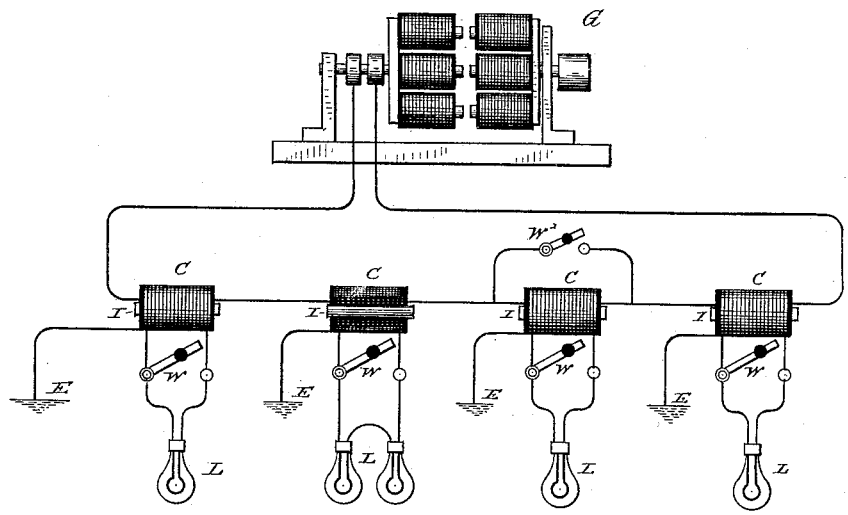
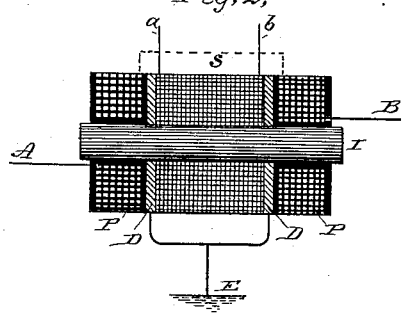
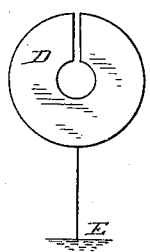
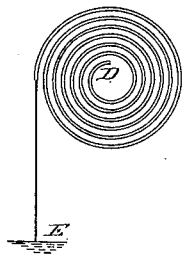
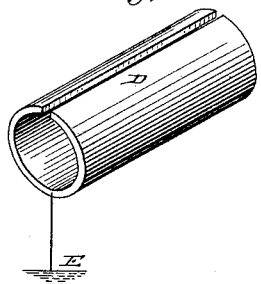
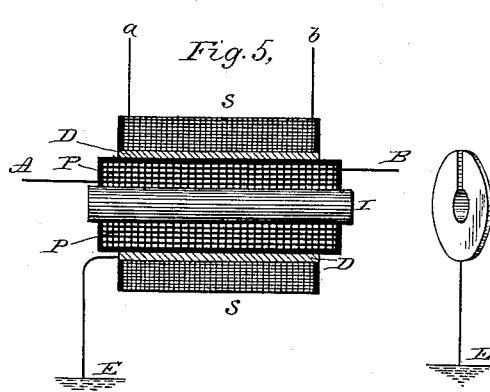
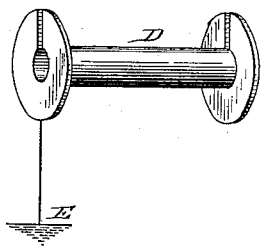
Witnesses:
Ernest Abshagen
Thos Toomey
Inventor:
Elihu Thomson
By his Attorney: H.C. Townsend
N. PETERS, Photo-Lithographer, Washington, D. C.

(No Model.) 2 Sheets—Sheet 2.
E. THOMSON.
SYSTEM OF ELECTRIC DISTRIBUTION.
No. 322,138. Patented July 14, 1885.
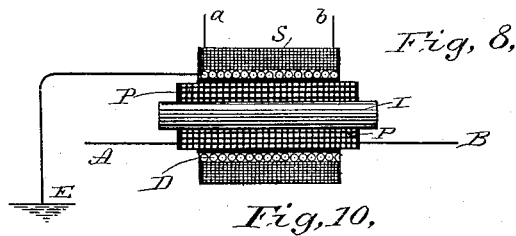
Fig. 8.
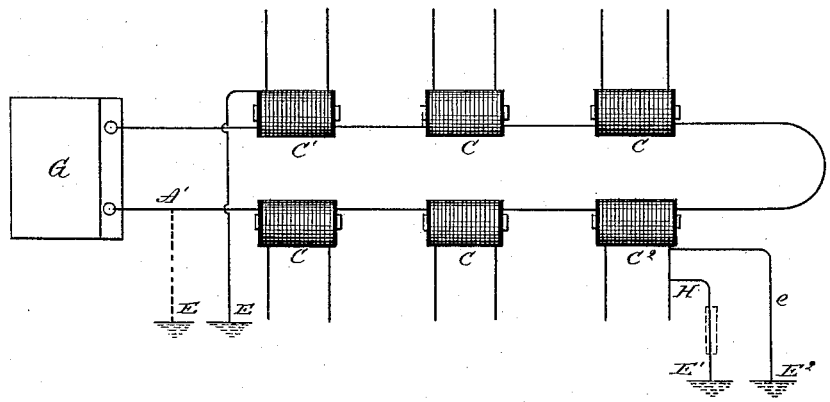
Fig. 10.
Fig. 9.
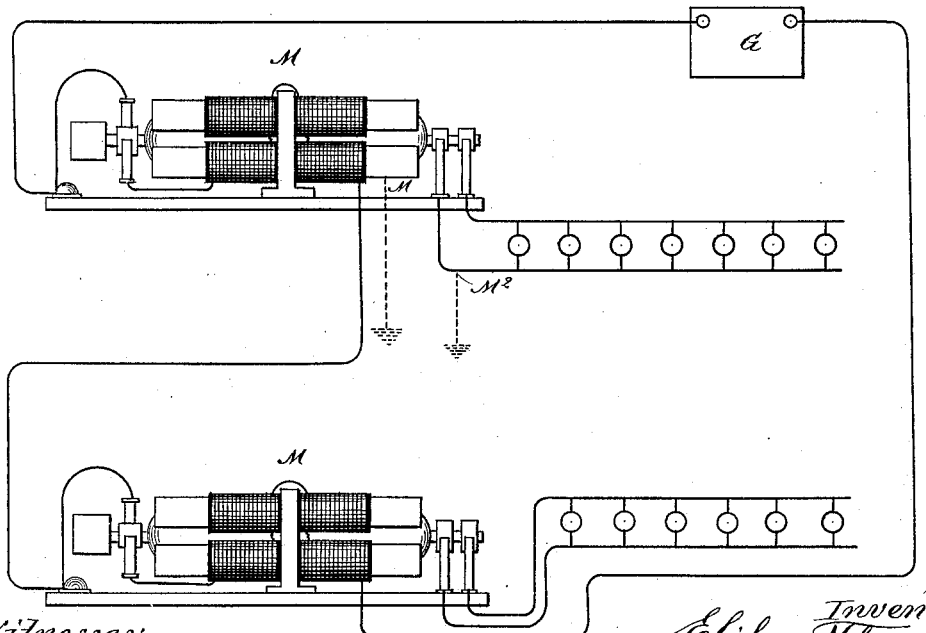
Witnesses:
Ernest A. Shafer
Thos. Toomey
Inventor:
Elihu Thomson
By his Attorney:

UNITED STATES PATENT OFFICE.

ELIHU THOMSON, OF LYNN, MASSACHUSETTS.

SYSTEM OF ELECTRIC DISTRIBUTION.

SPECIFICATION forming part of Letters Patent No. 322,138, dated July 14, 1885.

Application filed April 27, 1885. (No model.)

*To all whom it may concern:*

Be it known that I, ELIHU THOMSON, a citizen of the United States, and a resident of Lynn, in the county of Essex and State of Massachusetts, have invented certain new and useful Improvements in Systems of Electric Distribution, of which the following is a specification.

The present invention relates to a certain improvement in the system of electric distribution in which an electric current on a circuit including the primary coils of a series of induction-coils induces in a set of secondary coils placed in inductive relation to said primary coils secondary or induced electric currents which are utilized to operate incandescent electric lamps or to do other work.

My invention is applicable also to other systems in which high potential circuits are employed in connection with apparatus normally insulated from said circuit, but liable to accidental connection therewith.

My invention consists in the application to such a system of a device whereby the danger to the consumers of light or persons touching the secondary wires or local wires may be averted, even though a very high potential be used upon the main or primary line.

By means of my invention it is possible to supply, with entire safety to parties using the lights, one or more incandescent or other lights, supplied from secondary coils placed in or near the building, the primaries of which coils are connected to or into a main line upon which currents of very high potential may be employed, either alternating in character as delivered from the light-station or generating-station or interrupted or alternated at each induction-coil by suitable devices, such as have formed the subject of my prior application for Letters Patent, a continuous current being in such case supplied from a generator.

I will illustrate my invention by reference to the figures.

In the accompanying drawings, Figure 1 is a diagram illustrating my invention. Fig. 2 is a longitudinal section of an induction-coil to which my invention is applied in an approved manner. Figs. 3 and 4 show modifications in the form of separating grounded plate that is applied after the manner shown in Fig. 2. Fig. 5 is a longitudinal section of an induction-coil in which my invention is applied in another way. Fig. 6 is a perspective view of the grounded metal tube shown in Fig. 5. Fig. 7 shows another form of grounded plate applicable to an induction-coil. Fig. 8 shows another way of applying my invention. Fig. 9 shows another system of electric distribution to which my invention is applicable. Fig. 10 illustrates the conditions under which my invention becomes of effect in protecting persons from injury.

In Fig. 1, G represents an alternating-current generator, placed in a lighting-station, operated by power at any convenient point, from which extend insulated mains or conductors, preferably placed underground in a suitable conduit or pipe filled with dry air and carried to the place of consumption, such as buildings in a city and other points, the conductors being kept carefully insulated throughout as far as possible. The conductors are carried at various points through the primary coils of a series of induction-coils, C C C C, wound around suitable iron cores, I I I I, so that the primaries may magnetize said cores and change their magnetism, as will be readily understood. Around each primary, or adjacent to it, is wound a suitable secondary coil for supplying current to the lights L L L L, or other apparatus, suitable switches, W W W W, being provided to short-circuit the secondary coils and extinguish the lights. With a system thus constituted, should the primaries be of great number and the current supplied of very high potential, (which is necessary to economically transfer the energy to a very great distance from a generator, G, with moderate-sized conductors,) and should any portion of the system become grounded or subject to a leakage to earth, a person touching the secondary coils, himself being grounded upon moist surfaces or in connection more or less completely with the earth, would, if the insulation between the primary and secondary coils were leaky or faulty, receive a severe if not a fatal shock.

The object of my present invention is to provide a complete safeguard against any such possibility; and although I have illustrated the system in Fig. 1 as using alternating currents upon the main line, I wish it distinctly understood that my invention, so far as it affords a perfect safeguard from shocks or danger, is not limited to such a system, but may be applied to other systems, such as those employing continuous currents on a main line—as, for instance, an arc-light line upon which induction-coils with commuting or circuit-changing devices in the primary circuit are used. I render practicable a system the working of which would otherwise be fraught with great danger by an attachment which I will now describe. The secondary coil is wound with such coarse wire and the lamps used therewith are of such low volt potential as not in itself to produce dangerous discharges or shocks. I select a point of attachment for a lower resistance, or a short and thick wire leading to earth-plate E in Fig. 1, or gas or other mains, so as in any way to afford a secure ground. This attachment being provided for every secondary on the line, forms, practically, a shunt of no resistance around the person's body, who might otherwise receive dangerous shocks by being grounded and touching a secondary wire in accidental leaking connection with the accidentally-grounded main line. It is preferable in the system that the generator G be self-regulating in such a way as to permit switching one or more of the secondaries in the series, or the primary coils, as at W', without affecting the intensity of action or light in the remaining lamps. Methods of accomplishing this result will form the subject of other applications, my present invention being chiefly concerned with the application of the ground-connection, as will be further developed. It is not essential that the ground-connection be attached to a secondary coil or circuit of a secondary coil, as it may be attached to a separate conductor suitably interposed as a sort of diaphragm between the secondary and primary coils, although insulated from or in connection with the secondary itself. Thus, in Fig. 2, P P are primary coils in the main line, wound on the ends of the iron-wire core I or other divided core, and S a secondary coil, the terminals of which are indicated at $a\ b$. The core I and primary P P are thoroughly insulated by a layer of good insulating material placed between them, a layer also being interposed between the primary and secondary coils, so as to prevent as far as possible leakage; but as a further precaution two metallic diaphragms, D D, are placed near the secondary coil S and connected to the earth-plate E by a short good conductor. The core I in this case is preferably connected also either to the plates D D or directly to the earth-plate E or other ground-connections, of which it is the representative. The form of the disk or diaphragm may be greatly varied. In Fig. 3 it is shown as a split disk, with the earth-wire attached. In Fig. 4 the disk is shown as having a spiral form. Either form may be used. The disk constitutes a metallic septum insulated from the primary and insulated or not from the secondary, and by it any leakage from the primary, which would otherwise go to the secondary and connections, is intercepted and carried to the ground. In Fig. 5 the disk or septum is modified to form a tube surrounding the primary with its layer of insulation. Outside of the tube the secondary S is wound. In this case D is a split tube, as shown in Fig. 6, or a series of split rings may be substituted, or other means equivalent to this will suffice. In Fig. 7 it is shown as a metal spool split along its length for avoiding induction in its mass, and upon which the secondary coil itself is wound. In Fig. 8 it is shown as coarse wire forming a layer of the secondary coil, grounded at E, and insulated from the primary by an interposed sheet or tube of good insulating material.

It will be obvious that my invention may be of service in its application to any other system of electric distribution in which currents of high tension flow over a main circuit. In Fig. 9 I have illustrated its application to a system of distribution such as described in my prior application No. 141,792, filed August 3, 1884, in which electric motors in the high-tension line drive generators that supply current to local circuits. In this, as in the previous arrangements, the accidental connection of the line-circuit with any portion of the motor or of the local simultaneously with the formation of a ground at any portion of the line might result in a dangerous shock to any person coming into contact with the motor or with the local circuit or other portion of the apparatus normally insulated from but in position to become accidentally connected with the high-tension line. The application of the short-circuit ground-connection to the motor, as at M, or to the local circuit, as at M², would prevent, as before described, any difficulty on this score.

Fig. 10 illustrates the manner in which, if the earth-connection be applied according to my invention, the danger of shock will be avoided. The generator G is supposed to be feeding the line containing coils arranged as described in Fig. 1, with earth-connections arranged as hereinbefore described. We will suppose that a leak or ground-connection has accidentally been formed at some portion of the main line or circuit—as, for instance, at A', near the generator—or that a leak has occurred from the main line through defective insulation of a coil, as at C', and that the secondary circuit has been accidentally grounded, thus making a leak from the line-circuit through the primary to the secondary coil and to ground. If at the same time a defective insulation should exist at any other coil, as C², between the primary and secondary, and a person should touch the secondary, as at H, and at the same time be grounded in any way, as by contact with moist floors or by touching a water-pipe or other metallic surface of large extent in more or less complete connection with the ground, as indicated at E', such a person would be included in a shunt around a part of the main line grounded, as at A', or grounded through a leak from primary C' to an accidental ground of the secondary, and would receive a discharge depending on the power of the primary current and the resistance between the point at which he received the discharge and the other ground or leak. With very high potential on the main line such a shock or discharge would possibly prove fatal. If, however, the secondary, as $C^2$, had been purposely grounded by a short thick wire, as $E^2$, the person would be saved all the injurious consequences, as a shunt of low resistance would then exist around his body. Such a ground-connection being applied to all the coils in the circuit will effect a similar protection against all possible danger. At the same time lightning discharges accidentally reaching the main line cannot produce injury upon the secondary line.

It is manifest that where, as in Figs. 2 and 5, the ground-connection is made to a metallic diaphragm interposed between the primary and secondary coils an equally efficient, if not more efficient, protection from effects of leakage from the primary will be obtained.

As I have already mentioned, the main line for protection should be run underground, and should be inclosed in a suitably-insulated material—such as dry air—in a suitable exterior tube, loops being carried out at intervals, allowing the insertion into the circuit of the primary wire of the induction-coils; but as this forms no part of my present invention I merely indicate it as a preferred arrangement for inclosure and protection of the main line.

What I claim as my invention is—

1. In a system of electric distribution consisting of a high-potential circuit and local low-potential circuits, one or more out of actual contact with the high-potential circuit, ground-connections of low resistance connected to or located adjacent to the said local or secondary circuit, but normally insulated from the primary or feeding main-line circuit.

2. In a system of electrical distribution, a low-resistance ground-connection for carrying to earth any current that may leak or tend to leak from the primary main line to a secondary local line operated by energy abstracted from the main line without actual contact.

3. In a system of electric distribution, the combination of a generator of electric currents, two or more primary coils in circuit therewith, two or more induction or secondary generating-coils in operative inductive relation or energy-transferring relation to the said primary coils, electric lamps or other translating devices in circuit with said secondaries, and an earth-connection of low resistance to said secondaries applied in the manner described to short-circuit current leaking from the main or primary coils.

4. In a system of electric distribution, a generator of electric currents, two or more primary coils in circuit therewith, two or more induction or secondary generating coils in operative inductive or energy-transferring relation to the said primary coils, in combination with earth-connections of low resistance applied to the said secondaries so as to intercept leakage, and switch devices for short-circuiting said secondary coil and, when desired, for cutting out the circuit of one or more of the primary coils.

5. The combination, with the induction-coil, of a conductor intervening between the primary and secondary coils and connected to earth, as and for the purpose described.

6. The combination, with the main circuit carrying high-tension currents, and local-circuit apparatus operated by inductive transfer of energy, of short-circuit ground-connections, as and for the purpose described.

7. The combination, with the main line carrying currents of high tension, and local apparatus normally insulated from but liable to accidental connection with said line, of low-resistance ground-connections to said apparatus, as and for the purpose described.

Signed at Lynn, in the county of Essex and State of Massachusetts, this 22d day of April, A. D. 1885.

ELIHU THOMSON.

Witnesses:
E. WILBUR RICE, Jr.,
WILLIAM F. NOONAN.